June 2, 1931.  L. R. SMITH  1,808,265
MOTOR VEHICLE HOOD LOCKING MECHANISM
Filed Sept. 9, 1929  2 Sheets-Sheet 1

Inventor
Louis R Smith

Witness
Edwin L. Bradford

By Wm E Dyre
Attorney

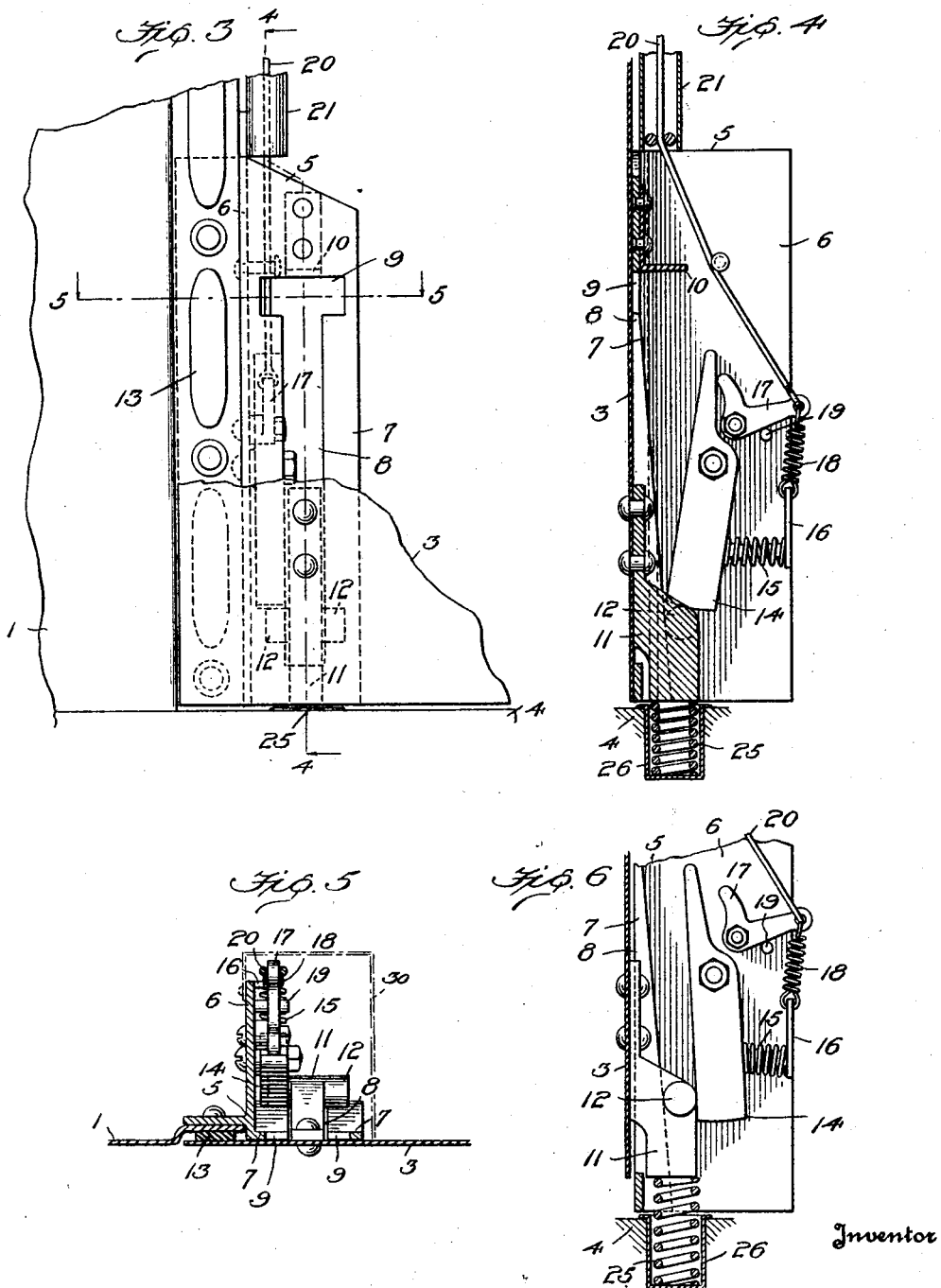

Patented June 2, 1931

1,808,265

UNITED STATES PATENT OFFICE

LOUIS R. SMITH, OF HAWTHORNE, NEVADA

MOTOR VEHICLE HOOD LOCKING MECHANISM

Application filed September 9, 1929. Serial No. 391,415.

My invention relates to an automobile hood locking mechanism, and has for an object the provision of means for readily and securely locking or latching the engine covering hood of a motor vehicle down upon the body or the sill or channel frame members of the chassis, to prevent unauthorized persons from gaining access to the motor and its appurtenant parts.

A further object of the present invention is to provide mechaism of the character indicated which is entirely concealed within the interior of the hood, so that the outside thereof presents the customary clear and uninterrupted appearance, unbroken by unsightly accessories or parts which may be tampered with to render the locking means inoperative.

Another object is to provide an efficient and simple locking device which is operable to lock the hood by merely pushing the hood down in place against the customary abutment surface provided in the frame of the vehicle and which may be unlocked by means of a removable key or the like cooperating with a lock positioned conveniently in the car, as for example on the dash or instrument board thereof.

Other and further objects will sufficiently appear from the detailed description hereinafter of the invention in one preferred form of embodiment, taken in connection with the accompanying drawings which form part of this application for Letters Patent, in which like reference characters indicate the same parts in the several views, and in which Figure 1 is a side elevational view of an automobile hood and appurtenant parts provided with locking mechanism in accordance with the principles of the present invention, with the upper part of the hood and body broken away the more clearly to show certain of the concealed parts;

Fig. 3 is a detail view showing in side elevation part of the hood and adjacent body portion of the vehicle provided with the elements which are adapted to cooperate to lock the same together;

Fig. 4 is a detail vertical sectional view taken through the hood at right angles to the view of Fig. 3, along the line 4—4 thereof, and shows the elements illustrated in Fig. 3 in their locking position;

Fig. 5 is a horizontal sectional view taken along the line 5—5 of Fig. 3, showing certain of the parts in top plan; and Fig. 6 is a view similar to that of Fig. 4, but showing the elements in their unlocked position.

Figure 1:
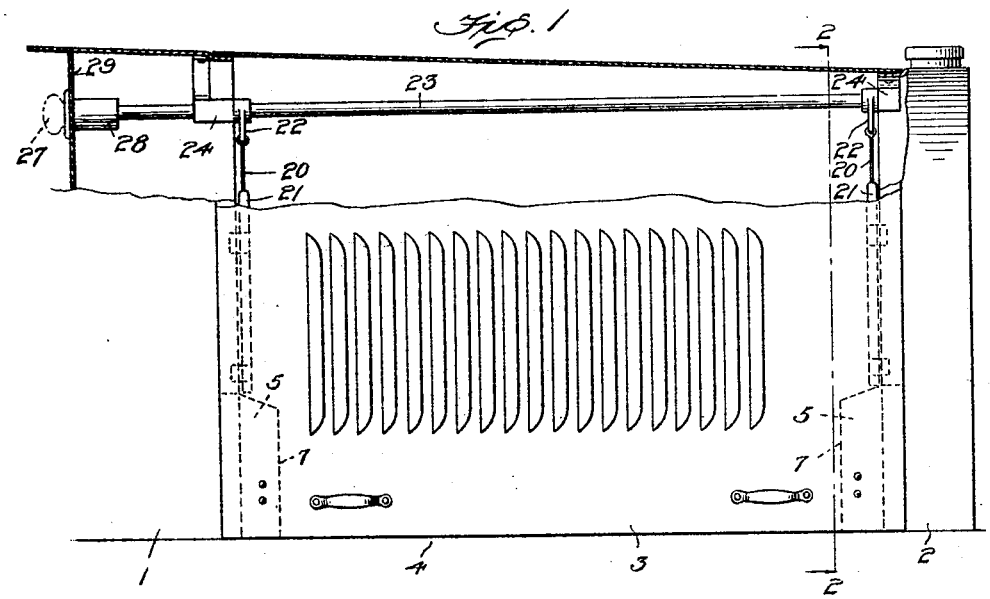

Referring now to the drawings, and first to Fig. 1, the reference numeral 1 designates the forward part of the body of an automobile, and 2 the radiator shell of the same. Between these two parts is disposed the hood, having lower vertical portions 3 which, when the hood is closed, abut against the upper surface 4 of the vehicle frame. Secured to the inner faces of the body and the radiator shell, and projecting therefrom inwardly behind the vertical portions 3 of the hood, are angled members 5, preferably four in number, each having a web 6 of uniform cross section extending into the engine space at right angles to the vertical portions of the hood, and another web 7 at right angles to the web 6. The web 7 has a vertical outer face to normally contact with the inner surface of the hood 3, and an inner face slightly inclined to slope inwardly and downwardly, as shown to advantage in Figs. 4 and 5, for a purpose to be hereinafter more fully explained.

In the inclined web 7 of each of the members 5 is formed a T-shaped slot from nearly the top to nearly the bottom thereof, comprising a relatively long and narrow slot 8 in the lower portion, communicating with a wider and shorter slot 9 in the upper portion of the guide, and just above the slot 9 there is riveted to the web 7 an angle bracket having an inwardly projecting stop web 10.

Riveted to the inner faces of the hood portions 3, at points thereon which are adapted to register with the slots 8, are lugs 11, each having spaced upwardly from the bottom thereof an enlargement in the form of a cross bar 12 which is adapted to fit through the appropriate wide slot 9.

It will be apparent from the description thus far that when cross bar 12 has been passed through slot 9, and the hood portion carrying lug 11 is pushed down into its closed position, the cross bar 12 will ride downwardly along the inclined inner face of web 7 to urge the hood 3 into close contacting relation with body 1 and radiator shell 2, or as is obviously preferable, with an interposed cushion lacing 13 of rawhide or the like. Outward movement of the hood 3 is thus prevented, as is rattling of the hood against the radiator shell and body.

It is, however, a further object of my present invention to prevent upward displacement of the hood 3 from the frame 4 when the hood is in its lowermost position, and I accomplish this object as follows:

Pivoted on the web 6 of member 5, I provide a locking pawl 14 which is urged outwardly by a coil spring 15 under compression between the pawl 14 and a small flange 16 extending at right angles from the inner edge of web 7. This pawl 14 is so positioned, and is of such length, that when hood 3 carrying lug 11 approaches its lowermost position, as shown in Fig. 6, pawl 14 will begin to ride over cross bar 12, and finally, when hood 3 has been pushed down home against frame 4, will spring outwardly over the cross bar 12, to the locking position shown in Fig. 4, to effectually prevent lifting of the hood 3 as long as pawl 14 is allowed to remain in its locking position.

In order to move the pawl 14 from its locking position of Fig. 4 to its retracted position of Fig. 6, I provide a small bellcrank 17, pivoted on the web 6 and kept normally retracted by the coil spring 18 which is disposed under tension between the bellcrank 17 and the flange 16. A stop pin 19 is provided to limit the retracted movement of the bellcrank. A cord 20, contained within a guide tube 21, has one of its ends secured to one arm of the bellcrank, and its other end fastened to an arm 22 carried by a rockshaft 23 which is conveniently journalled in bearing brackets 24 hung in the upper part of the engine space. It will be apparent that rotation of the shaft 23 in the proper direction will result in lifting the corded arm of the bellcrank 17 and cause the other arm thereof to move against the upper part of pawl 14 to displace the lower end of the pawl from its locking position on top of the cross bar 12.

I prefer to employ coil springs 25, received in recesses 26 in the vehicle frame 4, which are compressed by the lugs 11 when the hood is in its lowermost position. By this means, as soon as pawl 14 is moved by bellcrank 17 from over cross bar 12, the lug 11 and the hood portion which carries it are lifted a slight distance above the bottom edge of pawl 14, as shown in Fig. 6, to maintain the parts unlocked until the hood is again pushed down home against the frame. It will be apparent that with the parts in the unlocked position of Fig. 6, the hood may be completely opened by lifting the same until the cross bar 12 contacts with the stop 10, whereupon an outward pull on the hood will cause the cross bar 12 to pass through the horizontal or wider portion 9 of the T-slot, thereby disengaging the hood from the cooperating locking members fixed on the vehicle, and allowing the hood to be lifted in the usual manner. Locking of the hood is obviously accomplished by a reverse procedure, the cross bar 12 being first passed through the wider slot 9, then pushed downwardly in the slot 8 through the position of Fig. 6 into the position of Fig. 4, where the action of spring 15 throws pawl 14 into its locking position. Rattling of the parts is effectually prevented by the three springs 15, 18 and 25 which form part of each locking unit, and which by their compression or tension urge the various movable parts of each assembly firmly against other fixed parts.

It is obvious that the necessary rotation of rockshaft 23 may be accomplished by any well known means located in any convenient part of the vehicle. I prefer to employ a detachable key 27 fitting an ordinary barrel lock 28 mounted on the end of the rockshaft and passing through the dash or instrument board 29.

Figure 2:
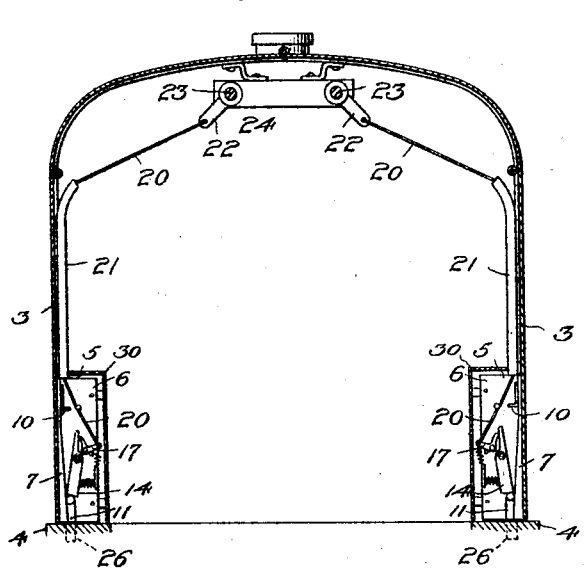
Fig. 2 is a transverse vertical section taken along the line 2—2 of Fig. 1.

I prefer to enclose the angled members 5 and their appurtenant elements in suitable housings, such as are shown at 30 in Figs. 2 and 5. The housing there shown consists of sheet metal detachably connected to the web 6 and formed to have a top and two sides. While of course this housing is not essential to the invention, I have found it desirable to thus protect the working parts of the device against accidental injury during repair or adjustment of the motor, and also against tampering by means of instruments inserted through the vertical vents in the hood by unauthorized persons.

It will be understood that my invention in its preferred form contemplates four complete locking assemblies, alike in all essential respects, positioned one in each lower corner of the hood, and that two rockshafts 23 are preferably employed, each shaft being connected by two cords 21 to the two locking assemblies on a single side of the hood. In this way two-point locking is provided for each side of the hood, and a single side of the hood may be readily unlocked without disturbing the other side thereof. It is to be noted, however, that if desired only one rockshaft 23 may be employed, the arms 22 thereon being in this case diametrically oppositely disposed, or in any other convenient and obvious manner, or indeed both rockshaft and cords may be entirely eliminated, any suitable actuating and connecting means being attached in their stead to the bellcranks 17. Furthermore, it is by no means essential to the spirit of my present invention that as many as four locking assemblies be provided, though I have found this number desirable for greatest convenience and efficiency in operation and results.

Other and further changes in specific details of embodiment of my invention may be made in practice, but all such changes are to considered within the spirit of the invention and within the scope and purview of the appended claims.

Having thus described my invention, what I claim and wish to secure by Letters Patent is:

1. In combination with a motor vehicle hood and body, a guide member provided with a vertical slot fixed to the body and having a stop member positioned at the upper edge of the slot, a lug carried by the hood and adapted to be passed through the slot adjacent the stop member to prevent outward displacement of the hood, and means for normally preventing upward displacement of the hood.

2. In combination with a motor vehicle hood and body, guide means carried by the body provided with a relatively wide slot in its upper portion communicating with a narrower slot in its lower portion, and a lug carried by the hood adapted to be passed through the wide slot and then to engage the guide means adjacent the narrow slot to prevent outward displacement of the hood.

3. In combination with a motor vehicle hood and body, guide means fixed to the body and provided with a T-shaped slot, a T-shaped lug carried by the hood and adapted to be inserted in the slot and moved downwardly therein to prevent lateral displacement of the guide means and lug, and means for normally preventing upward displacement of the lug.

4. In combination with a motor vehicle hood and body, guide means carried by the body having a vertical slot and a horizontal slot at the upper end of the vertical slot, a lug carried by the hood having a lateral enlargement extending in spaced parallel relation to the hood adapted to be received through the horizontal slot and to be engaged with the guide means adjacent the vertical slot, and retractible means for holding the lug in engagement with the guide means adjacent the vertical slot.

In testimony whereof I affix my signature.

LOUIS R. SMITH.